United States Patent [19]

Faas

[11] Patent Number: 5,611,115
[45] Date of Patent: Mar. 18, 1997

[54] SLIVER-DELIVERY MACHINE AND A SLIVER COILER

[75] Inventor: Jurg Faas, Dinhard, Switzerland

[73] Assignee: Rieter Machine Works, Ltd., Winterthur, Switzerland

[21] Appl. No.: 392,039

[22] Filed: Feb. 22, 1995

[30] Foreign Application Priority Data

Mar. 9, 1994 [CH] Switzerland .................. 00691/94

[51] Int. Cl.$^6$ .................. D01G 15/62; B65H 54/80; B65H 54/74
[52] U.S. Cl. .................. 19/98; 19/293
[58] Field of Search .................. 19/98, 293; 318/68, 318/77, 85; 57/100; 242/47

[56] References Cited

U.S. PATENT DOCUMENTS

| | | | |
|---|---|---|---|
| 3,667,092 | 6/1972 | Eschenbach | 242/47 |
| 3,675,864 | 7/1972 | Eschenbach | 242/47 |
| 4,423,360 | 12/1983 | Pasterkamp | 318/85 |
| 4,447,788 | 5/1984 | Mundt et al. | 318/85 X |
| 4,530,134 | 7/1985 | Hosel . | |
| 4,617,498 | 10/1986 | Ruppert | 318/85 |
| 4,654,569 | 3/1987 | Mizumoto et al. | 318/85 X |
| 4,736,580 | 4/1988 | Wolf | 57/100 |
| 4,951,359 | 8/1990 | Leifeld et al. | 19/98 |
| 5,202,611 | 4/1993 | Uehara et al. | 318/85 |
| 5,231,335 | 7/1993 | Mega et al. | 318/85 |
| 5,312,033 | 5/1994 | Walton et al. | 318/85 X |
| 5,320,266 | 6/1994 | Noe et al. | 318/85 X |
| 5,438,733 | 8/1995 | Melcher et al. | 19/293 |

FOREIGN PATENT DOCUMENTS

| | | |
|---|---|---|
| 0312774 | 4/1989 | European Pat. Off. . |
| 0512683 | 11/1992 | European Pat. Off. . |
| 3734425 | 3/1989 | Germany . |
| WO92/04266 | 3/1992 | WIPO . |

OTHER PUBLICATIONS

Textil Praxis International, "Rotary Cuddent Motor Including Frequency Converters for Textile Machines", Jan. 1992, pp. 37–38.

*Primary Examiner*—John J. Calvert
*Attorney, Agent, or Firm*—McAulay Fisher Nissen Goldberg & Kiel, LLP

[57] ABSTRACT

A sliver-delivering machine such as a card and a sliver coiler are each provided with an independent drive including a frequency-controlled free-phase motor. In addition, a frequency converter is connected in common to the motor of each drive for supplying power to each. The motors of the sliver-delivering machine and the coiler have a load-dependent speed characteristic, for example, each is an asynchronous motor with a maximum slip of 3% over a delivery speed range of up to 300 m/min.

12 Claims, 4 Drawing Sheets

SLIVER-DELIVERY MACHINE AND A SLIVER COILER

This invention relates to a sliver-delivery machine and a sliver coiler. More particularly, this invention relates to a drive for driving a sliver-delivered machine and a sliver coiler in synchronism.

As is known, various arrangements have been known which employ a sliver-delivery machine such as a carding machine and a sliver coiler such as a can pres or can coiler. For example, such arrangements are known from EP-A-512683, DE-C-3734425 and WO92/04266. Typically, the sliver-delivery machine is provided with a drive for driving the elements of the machine while the sliver coiler is provided with a separate drive for driving the elements of the coiler. The advantages of having the sliver coiler possess its own drive (known as an autonomous sliver coiler) are set forth in DE-C-3734425. Normally, the drive for the sliver coiler is controlled by means of a sensor which samples the sliver feed between the card outlet and the sliver coiler. The sensor serves to issue a signal which is used to control a feed back control device provided specifically for the drive of the sliver coiler.

Other arrangements have also been known, such as a Trutzschler DK760 card which includes so-called servo-shafts or servo-axes which are controlled by an integral control device wherein each shaft is controlled separately. Such servo-shafts are described in U.S. Pat. No. 4,530,134. However, there is no description of a sliver coiler (i.e. a can press).

Although the known arrangements operate satisfactorily, these arrangements have been expensive either because the arrangements require additional elements or because the elements themselves are expensive or both.

A more modern drive system for a textile machine based on frequency conversion has been described, for example, in "Three-phase motors with frequency converters for textile machines" (Textile Praxis International 1992, January, Page 37, 38). This type of drive for a card is described in e.g. DD-A-224626, a number of (single) converters being used in this case. However, the publication states that faulty drafts can easily occur in a sliver run between the sliver-delivering machine and the sliver coiler. Thus, it has been assumed that faulty drafts cannot be avoided without special drive system measures.

Accordingly, it is an object of the invention to provide a relatively simple arrangement for driving a sliver-delivering machine and a sliver coiler in synchronism.

It is another object of the invention to provide a relatively inexpensive arrangement for driving a sliver-delivering machine and a sliver coiler in synchronism with each other.

It is another object of the invention to drive a sliver-delivering machine and a sliver coiler from a common power source.

Briefly, the invention provides the combination of a sliver-delivering machine including sliver-delivering elements and a first drive for driving the elements and a sliver coiler for receiving sliver from the machine and including a drive for driving the coiler. The respective drives of the machine and the coiler are independent of each other and each includes at least one motor having a load-dependent speed characteristic, for example, a frequency-controlled A.C. motor.

In accordance with the invention, a frequency converter is connected in common to the drive of the sliver-delivering machine and to the drive of the sliver coiler in order to supply power to each drive. Alternatively, a pair of frequency converters may be coupled to each other and to the respective motors. In this case, the converters would be coupled together in order to produce the same output frequency or output frequencies which are in a preselected ratio to each other.

The A.C. motors which are used may each be an asynchronous motor, that is a motor which has a slip such as to exhibit a load-dependent speed characteristic at a constant supply frequency. Such a characteristic can be used in spite of the risk of a faulty draft because the load variations to be anticipated in operation exhibit types of behavior at the determining points which are so similar that, in practice, the difference in the relative speed errors (i.e. the speed difference relative to the synchronous speeds) remains within very narrow limits (acceptable tolerances).

In accordance with the invention, the drive system for the sliver-delivery machine and the sliver coiler thus has a motor control unit for supplying electrical power to each motor in order to define a speed for each motor. This motor control unit includes a controllable power circuit for controlling the frequency of the electrical power supplied to each motor in order to maintain any slip produced in each motor during operation within pre-definable limits. In this regard, the motor control unit is in the form of a frequency converter so that the respective motors are controlled by means of the supply frequency.

For reasons of cost, asynchronous motors (e.g. squirrel-cage motors) are normally chosen, but the use of other motors capable of being controlled by the supply frequency (e.g. reluctance motors or even synchronous motors) is not precluded. The preferred type of motor is the so-called geared motor. The effective speed of such a motor is affected by both the supply frequency and the transformation or reduction ratio of the gear assigned to the motor. The gear can comprise change points (i.e. locations in the gear train at which a ratio change can be effected, regardless of how the change is made) so that an effective speed can be set for a given supply voltage. Preferably, however, the complete system is arranged so that change points are not necessary.

The drive for the sliver coiler may include a number of motors, for example, one motor for sliver feed rollers and a tube gear and a second motor for a revolving disc. Alternatively, there may be only one motor in the sliver coiler (cf. DE-C-3734425), in which case, the motor power must then be transferred mechanically between the upper and lower parts of the sliver coiler.

The arrangement of the invention is of particular importance for a card, due to the fact that the acceptable tolerances for faulty drafts in the intermediate product of this machine are wider than, for example, in connection with a regulated second passage draw frame. The invention is therefore not intended for use in the autoleveller draw frame.

Present card delivery speeds range from 10 m/min to 30 m/min. The sliver count normally lies within the range of 3.5 to 6.5 ktex. The drive motors for the sliver-delivering elements of the card (outlet) have rotational speeds of between 150 and 4500 rpm at supply frequencies of between 5 and 150 Hz. A frequency converter power output of between 1.5 and 3 kWatt is required to supply power to both the card outlet and the sliver coiler.

The invention also provides a coiler of different construction then previously known. That is to say, the coiler has a top section with working elements and a bottom section with working elements. In accordance with the invention, at least one motor is provided for driving the working elements of at least one of these sections wherein the motor is controllable in dependence on the frequency of the electrical power supplied to the motor. A means such as the motor control unit described above is also provided for supplying frequency dependent power to the motor from a textile machine, e.g. a card, remote and upstream of the coiler.

These and other objects and advantages of the invention will become more apparent from the following detailed description taken alone or in combination with the following:

Figure 1:
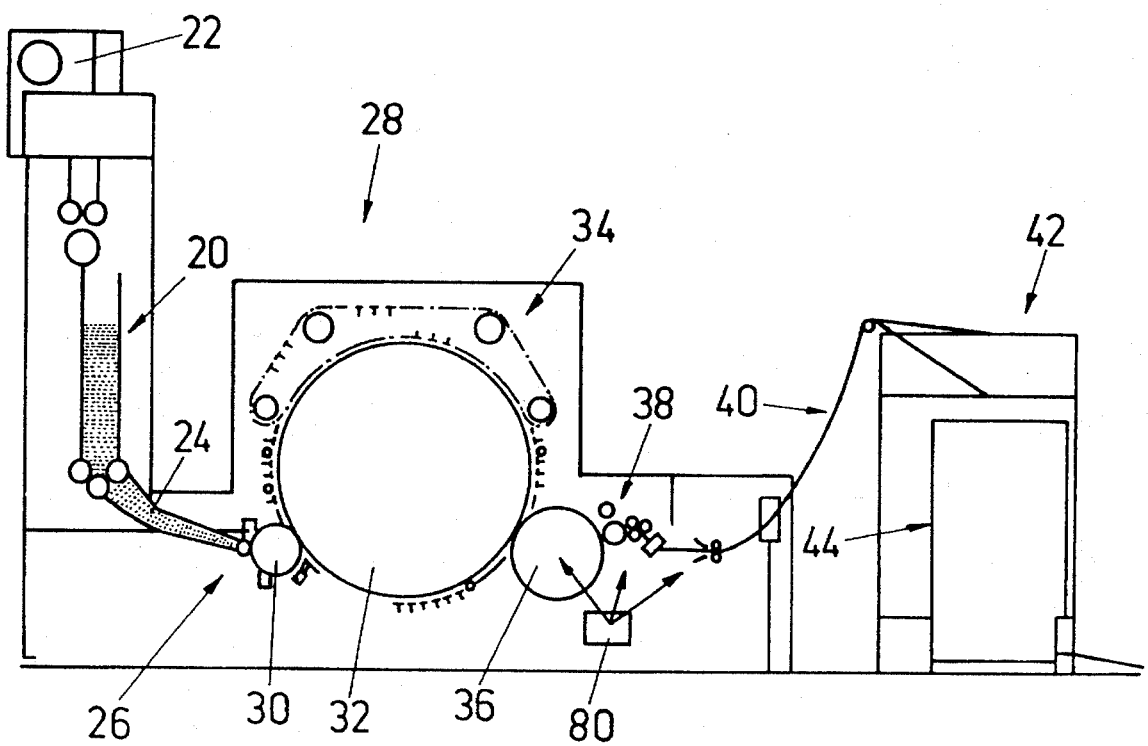
FIG. 1 shows a schematic side view of a carding machine comprising a material delivery device, a card and a sliver coiler coupled to the card in accordance with the invention.

Referring to FIG. 1, a sliver-delivering machine in the form of a carding machine comprises a feeding chute 20 which contains fiber material from a flock conveyor system 22, indicated in schematic form, and which forms a batt 24 which is transferred to a feed device 26 of a card 28. The card 28 is of conventional construction, with a licker-in 30, a cylinder 32, a revolving flat device 34 and a doffer 36 which forms part of an output 38. Formed within the card output 38 is a sliver 40 which is delivered to a sliver coiler (can press or can coiler) 42 where the sliver 40 is laid in coils in a can 44.

Figure 2:
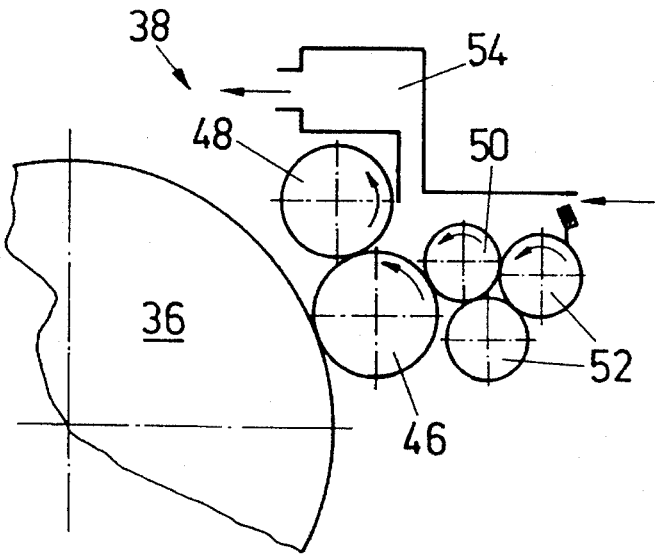
FIG. 2 shows a schematic side view of the working rollers in the card outlet.

Referring to FIG. 2, the output 38 of the carding machine comprises, in addition to the doffer 36, a take-off roller 46, a cleaning roller 48, a transfer roller 50 and a pair of gripping rollers 52. A suction extraction system 54 which is not directly relevant to this invention is also provided but need not be described further. The arrangement illustrated has been described, in a substantially simplified form, in Swiss Patent Applications 2673/93 of 8 Sep. 1993 and 142/94 of 18 Jan. 1994.

Figure 3:
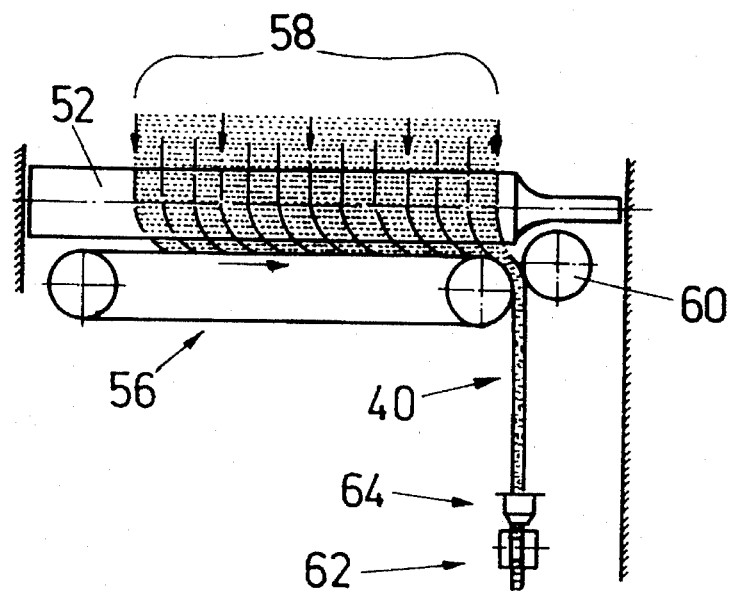
FIG. 3 shows a schematic view from above of the sliver-forming elements in the card outlet.

Referring to FIG. 3, the gripping roller 52, viewed from above, functions in combination with a so-called crossband 56 by means of which a web 58 delivered from the pair of gripping rollers 52 is deflected laterally and combined by means of a deflection roller 60 to form a sliver 40 (see FIG. 1) (e.g. according to EP-A-549534). The sliver 40 is drawn off by means of a pair of stepped rollers 62 through a funnel 64 and delivered from the card (machine) 28 at a predefined speed. A unit comprising a pair of stepped rollers suitable for this purpose is described in EP-A-370232.

Figure 4:
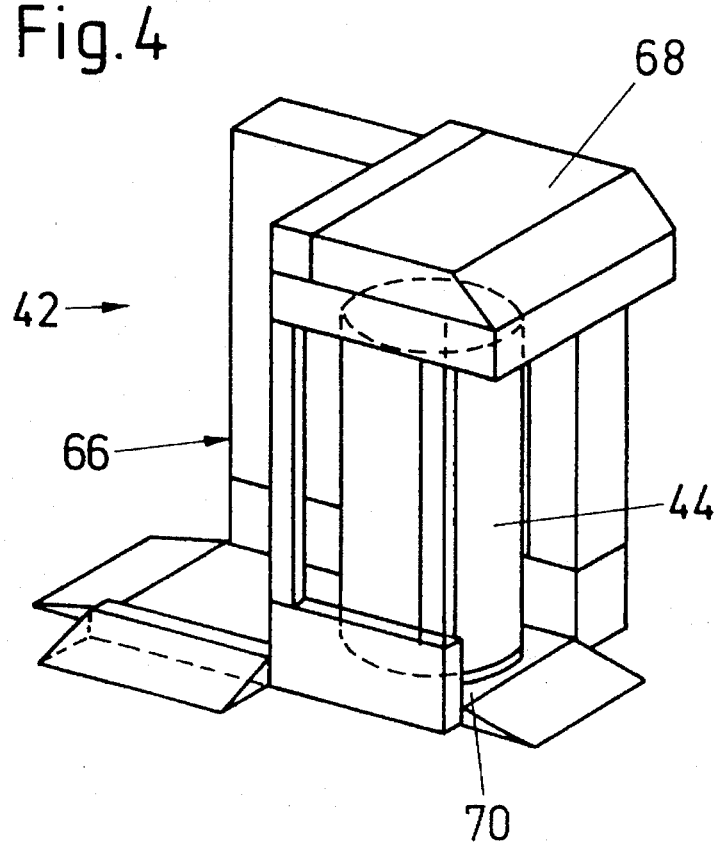
FIG. 4 shows a schematic isometric representation of the sliver coiler.
Figure 5:
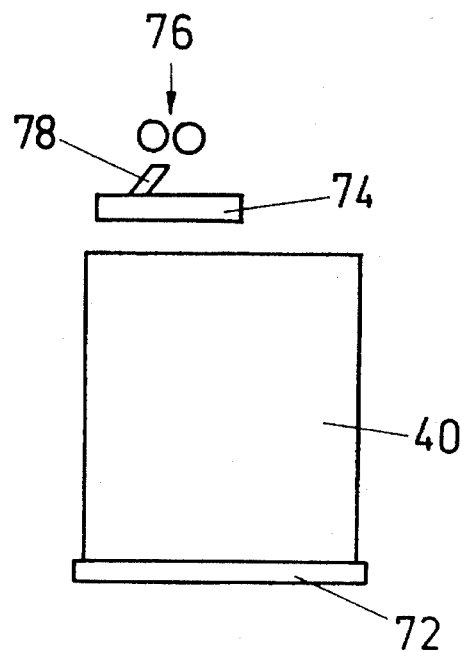
FIG. 5 shows a schematic representation of the main working elements of the sliver coiler.

As shown in FIG. 1, a sliver coiler 42 is positioned adjacent the output 38 of the carding machine to receive the sliver 40. This coiler 42 is an autonomous machine with its own drive (as explained more fully below) and comprises a frame 66 (FIG. 4) with a top section 68, a base section 70 and, located between these, a can mounting section. The main working elements of the sliver coiler 42 are shown in schematic form in FIG. 5 and comprise a revolving plate 72 in the base section 70; a tube gear 74 in the top section 68; and a pair of feed rollers 76 above (or below) the tube gear 74.

The can 44 is positioned on the revolving plate 72 and fastened by suitable means (not illustrated) so as to be incapable of rotation relative to the plate 72. The revolving plate 72 is rotated around a vertical axis by means of the sliver coiler drive described below, the can 44 being driven together with the disc plate 72. The tube gear 74 is rotated, independently of the sliver coiler drive, around a second vertical axis (e.g. according to EP-A-394773), the sliver 40 being drawn over a guide 78 into the can 44 where the sliver 40 is laid in coils of a predefined form. The sliver 40 is passed into the guide channel 78 through the pair of guide rollers 76, each of the rollers 76 being rotated around its own horizontal longitudinal axis by the sliver coiler drive.

An embodiment of a drive for the card itself is described in, e.g. the German Utility Model Application G9312638.7 of 24 Aug. 1993. This drive comprises a main drive motor (not illustrated) for the cylinder 32 (FIG. 1) and the revolving flat 34. The main drive motor can be constructed according to, e.g. EP-A-557242. There is also a drive 80 for the doffer 36 and the other working elements of the output 38 up to and including the pair of stepped rollers 62 (FIG. 3), as indicated schematically in FIG. 1 by the arrows radiating from the drive motor 80.

The drive for the sliver coiler 42 can be assumed to be a drive according to DE-C-3734425 in which the sliver coiler drive comprises either one or, if necessary, two three-phase motors which (or each of which) is controlled by means of a frequency converter assigned solely to the sliver coiler 42. The output frequency of the converter is determined basically by a signal generated by sliver feed rollers. The sliver feed rollers according to DE-C-3734425 correspond to the stepped rollers 62 (FIG. 3). According to DE-C-3734425, a signal is also derived from a fine adjustment sensor which samples the tension of the sliver loop, forming a closed-loop control circuit. The sliver coiler is practically "fully autonomous" in relation to the textile machine (which is not illustrated in the DE patent specification) since it is possible to derive a signal from the sliver feed rollers without the necessity of altering the design of the machine itself. To achieve this, it is necessary, however, for the sliver coiler to possess elements which are actually already present in the machine, the control signals required for the sliver coiler also being already "available" in the machine itself.

Figure 6:
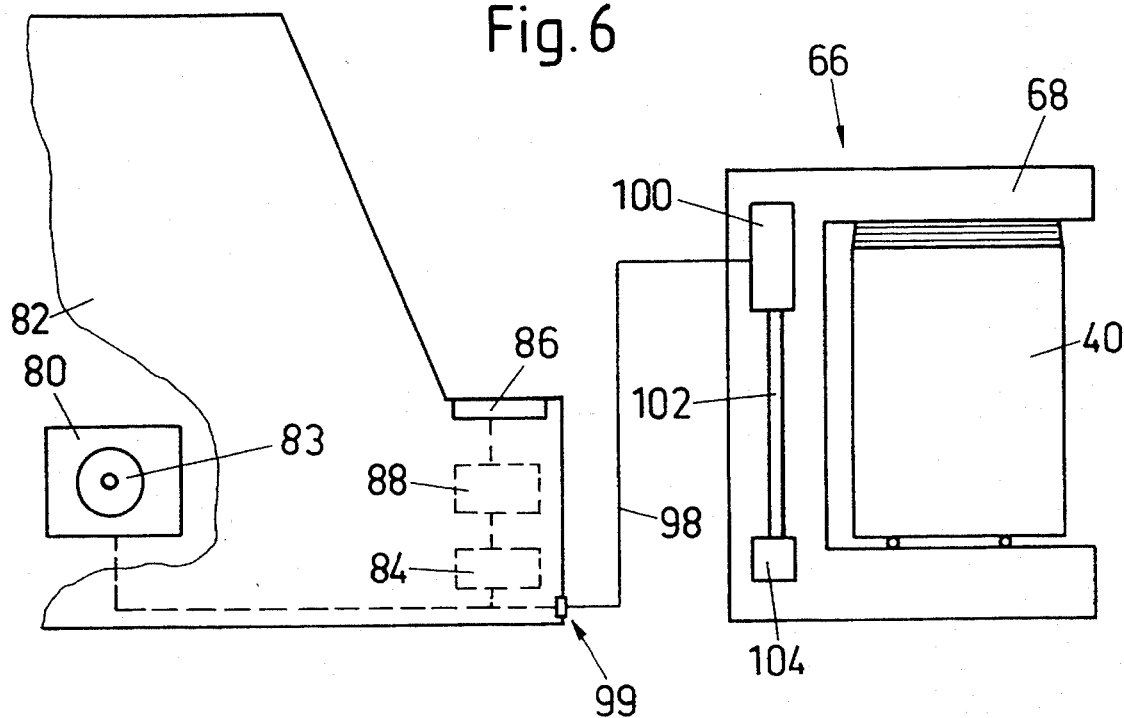
FIG. 6 shows a schematic representation of a first drive variant according to the invention.

Referring to FIG. 6, the drive 80 of the carding machine is mounted within a casing 82 which, in a cost-effective embodiment, comprises a steplessly controllable maintenance-free asynchronous motor 83 (e.g. a squirrel-case motor) which is supplied with electrical power via a frequency converter 84. As indicated, the output frequency of the converter 84 can be set through an input unit 86 integrated with a programmable controller 88 of the carding machine. An arrangement of this type is conventional and the drive 80, motor 83, converter 84, input unit 86 and controller 88 (or their equivalents) are virtually indispensable for a modern card.

Figure 6A:
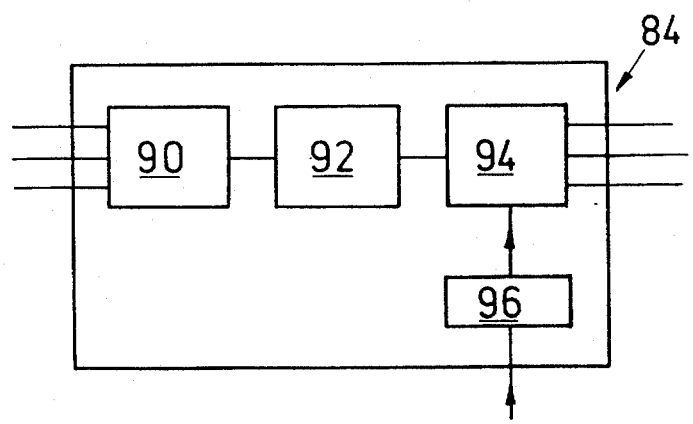
FIG. 6A shows a detail from FIG. 6.

Referring to FIG. 6A, the frequency converter 84 functions as a motor control unit and includes a rectifier 90 which receives alternating current from a three-phase network and delivers direct current to an intermediate circuit 92. A controllable power circuit 94 converts the direct current from the intermediate circuit 92 into alternating current having a frequency which is determined by a converter controller 96 using a signal from the controller 88 (see FIG. 6). This single-phase or three-phase alternating current is then delivered to the motor 83 (see FIG. 6).

The output frequency of the frequency converter 84 defines, as a single value, the synchronous speed of the motor 83. The effective rotational speed of the motor shaft, however, is not solely dependent on this synchronous speed. This speed also depends on the load to which the motor is subjected, i.e. a so-called "slip" is produced in the motor 83 between the rotor and the stator of the motor 83. This fact alone would not cause any problem at all if the slip were predictable. In practice, however, the slip varies continuously in relation to the instantaneous load ratios, which cannot be precisely predicted.

Accordingly, the known systems have employed special measures of one kind or another in order to allow for the continuously varying ratios, with resultant increased constructional complexity and costs.

Although the slip cannot be controlled, the "slip behavior" (i.e. the progression of the slip variations in relation to load changes) can be estimated with respect to both direction and order of magnitude. In the output section, this relates essentially to frictional losses and compression work, for example, as the sliver is drawn through the funnel 64 (FIG. 3). Such load components are dependent on the sliver count and the delivery speed. Over a delivery speed range of up to 300 m/min. it is possible to select asynchronous motors which have a maximum slip of 3% under these conditions.

The frequency converter 84 will normally be designed to also be capable of supplying the necessary power to the sliver coiler 42, this being due to the fact that the card must be constructed for driving a mechanically coupled sliver coiler. There is therefore no problem in tapping off from the converter output the energy required for an "autonomous" sliver coiler, e.g. by means of a socket output 99 in the card casing 82, and feeding this power via a cable 98 to a drive motor 100 for the sliver coiler 42. The motor 100 is a simple A.C. geared motor which, like the motor 83, is controlled directly by the power derived from the frequency converter 84.

In the variant according to FIG. 6, the arrangement corresponds to the sliver coiler according to DE-C-3734425 insofar as the motor 100 directly drives the working elements of the top section and indirectly drives the working elements of the base section through a drive 102 and a transmission 104. In this variant, the slip behavior of the motor 100 is the same as the corresponding behavior of the motor 83, due to the fact that the slip behavior is determined by the same operating parameters. This means that the anticipated difference between the slip occurring in the motor 83 and that occurring in the motor 100 is approximately constant, with a consequent absence of significant faulty drafts (draft variations). This unexpected outcome of a closer examination of the overall system permits the use of a motor 100 which, like the motor 83, can be selected on the basis of cost-effectiveness.

Figure 7:
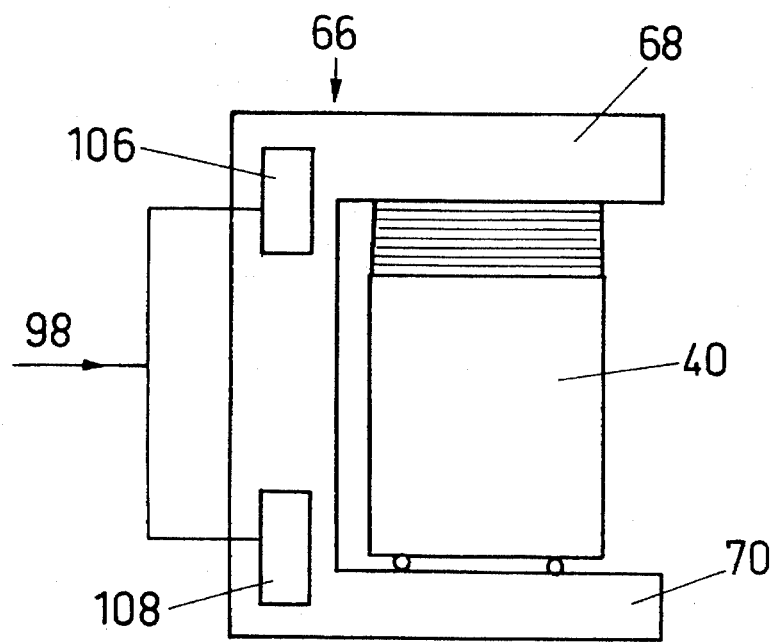
FIG. 7 shows a second drive variant according to the invention.

The variant according to FIG. 7 differs from that according to FIG. 6 insofar as there is a motor 106 for the working elements of the top section 68 and a motor 108 for the working elements of the base section 70. Power is supplied to each motor 106, 108 of the sliver coiler drive directly from the frequency converter 84 via the cable 98. In this variant, the power to be delivered by the motor 108 varies according to the filling of the can. This can result in the slip difference between the motor 106 and the motor 108 varying by an order of magnitude of 1 to 2%. However, this variation during filling of a can is not serious—i.e. there is only a slight variation in the separations between the first and the last coils, which is not significant for further processing.

Draft changes can be effected by changing the gear ratio. For example, a gear wheel can be removed and replaced by another gear wheel with a different number of teeth. In the preferred solution, there is no changing of the gear ratio between the motor 83 and the pair of stepped rollers 62 since otherwise, if there is no draft change, a transformation or reduction ratio change at this point necessitates a corresponding change changing the gear ratio of the motor 100 or 106 which determine the draft.

Application of the invention is dependent on the slip behavior of the drive for the machine output being the same as that of the sliver coiler drive. This requirement can be fulfilled even if not all elements in the output are driven by a single motor. Normally, the output between the doffer 38 and the deliver point will be actuated by only one drive source.

What is claimed is:

1. In combination a card including sliver-delivery elements and a first drive for driving said elements, said drive having at least one frequency-controlled A.C. motor;

a sliver coiler for receiving sliver from said card and a second drive for driving said coiler, said second drive including at least one frequency-controlled motor; and a frequency converter connected in common to said first drive and said second drive for supplying power thereto, said frequency converter having an output frequency defining the synchronous speed of said motor of said first drive and said motor of said second drive to drive said coiler in synchronism with said card with a consequent absence of significant draft variations in the sliver delivered therebetween.

2. The combination as set forth in claim 1 wherein each motor is an asynchronous motor.

3. The combination as set forth in claim 1 wherein each motor has a maximum slip of 3% over a delivery speed range of up to 300 meters per minutes.

4. In combination a sliver-delivering machine including sliver-delivering elements and a first drive for driving said elements, said drive having a load-dependent speed characteristic;

a sliver coiler autonomous from said sliver-delivery machine for receiving sliver from said machine, said coiler having a second drive independent of said first drive and including at least one motor having a load-dependent speed characteristic and a motor control unit for supplying electrical power to each said motor to define a speed for each motor to drive said coiler in synchronism with said machine.

5. The combination as set forth in claim 4 wherein said motor control unit includes a controllable power circuit for controlling the frequency of the electrical power supplied to each motor to maintain any slip produced in each said motor during operation within predefinable limits.

6. The combination as set forth in claim 5 wherein said motor control unit is a frequency converter.

7. The combination as set forth in claim 6 wherein each motor is an asynchronous motor.

8. The combination as set forth in claim 7 wherein each motor is a geared motor.

9. The combination as set forth in claim 4 wherein said sliver coiler includes a top section having working elements, a first motor for driving said elements, a bottom section having working elements and a second motor for driving said elements of said bottom section and wherein said first motor and said second motor are connected in parallel to said motor control unit.

10. The combination as set forth in claim 9 wherein said first motor and said second motor of said coiler is each a three-phase geared motor.

11. In combination a sliver-delivering machine including sliver-delivering elements and a first drive for driving said elements, said drive having at least one frequency-controlled A.C. motor;

a sliver-coiler autonomous from said sliver-delivering machine for receiving sliver from said machine and a second drive including at least one frequency-controlled A.C. motor for driving said coiler; and a pair of frequency converters for supplying power to said motors, each frequency converter being connected to a respective one of said motors and being coupled to the other frequency converter to produce the same output frequency or output frequencies in a preselected ratio.

12. In combination a sliver-delivering machine including sliver-delivering elements and a first drive for driving said elements, said drive having at least one frequency-controlled A.C. motor;

a sliver coiler autonomous from said sliver-delivery machine for receiving sliver from said machine and having a second drive for driving said coiler, said second drive including at least one frequency-controlled motor; and a frequency converter connected in common to said first drive and said second drive for supplying power thereto, said frequency converter having an output frequency defining the synchronous speed of said motor of said first drive and said motor of said second drive to drive said coiler in synchronism with said card with a consequent absence of significant draft variations in a sliver delivered therebetween.

* * * * *